(12) United States Patent
Daniel et al.

(10) Patent No.: US 7,450,741 B2
(45) Date of Patent: Nov. 11, 2008

(54) GRAY SCALE MATCHER

(75) Inventors: Sam M. Daniel, Tempe, AZ (US); Peter Z. Lo, Lake Forest, CA (US); Harshawardhan M. Wabgaonkar, Lake Forest, CA (US)

(73) Assignee: Motorola, Inc., Schaumburg, IL (US)

( * ) Notice: Subject to any disclaimer, the term of this patent is extended or adjusted under 35 U.S.C. 154(b) by 517 days.

(21) Appl. No.: 10/873,790

(22) Filed: Jun. 22, 2004

(65) Prior Publication Data

US 2004/0258284 A1 Dec. 23, 2004

Related U.S. Application Data

(60) Provisional application No. 60/480,881, filed on Jun. 23, 2003.

(51) Int. Cl.
*G06K 9/00* (2006.01)
(52) U.S. Cl. .................... 382/124; 382/115; 382/125
(58) Field of Classification Search ................ 382/115, 382/116, 124, 125, 168, 169, 170
See application file for complete search history.

(56) References Cited

U.S. PATENT DOCUMENTS

| | | | |
|---|---|---|---|
| 5,040,223 A | 8/1991 | Kamiya et al. | |
| 5,050,220 A | 9/1991 | Marsh et al. | |
| 5,054,090 A | 10/1991 | Knight et al. | |
| 5,067,162 A * | 11/1991 | Driscoll et al. | 382/126 |
| 5,239,590 A | 8/1993 | Yamamoto | |
| 5,524,161 A * | 6/1996 | Omori et al. | 382/125 |
| 6,002,787 A * | 12/1999 | Takhar et al. | 382/125 |
| 6,052,474 A * | 4/2000 | Nakayama | 382/124 |
| 6,111,671 A | 8/2000 | Bahuguna et al. | |
| 6,134,340 A * | 10/2000 | Hsu et al. | 382/124 |
| 6,201,886 B1 * | 3/2001 | Nakayama | 382/124 |
| 6,341,028 B1 | 1/2002 | Bahuguna et al. | |

OTHER PUBLICATIONS

Ratha, Karu, Chen, and Jain, "A Real-Time Matching System for Large Fingerprint Databases," Aug. 1996 IEEE Transactions on Pattern Analysis and Machine Intelligence, vol. 18, No. 8, pp. 801-808.*

* cited by examiner

*Primary Examiner*—Samir A Ahmed
*Assistant Examiner*—Stephen R Koziol
(74) *Attorney, Agent, or Firm*—Valerie M. Davis

(57) ABSTRACT

A method for comparing a first print image having a first set of minutiae to a second print image having a second set of minutiae, wherein at least a second subset of minutiae from the second set is mated to a first subset of minutiae from the first set, the method that includes the steps of: selecting (350) a first pair of minutiae from the first subset and a second pair of corresponding mated minutiae from the second subset; generating (350) a first segment based on the first pair of minutiae and a second segment based on the second pair of minutiae; generating (360) a first cross-section profile based on the first segment and a second cross-section profile based on the second segment; and computing (365) at least one similarity measure that is indicative of the similarity between the first cross-section profile and the second cross-section profile.

24 Claims, 6 Drawing Sheets

*FIG. 4*
*FIG. 5*
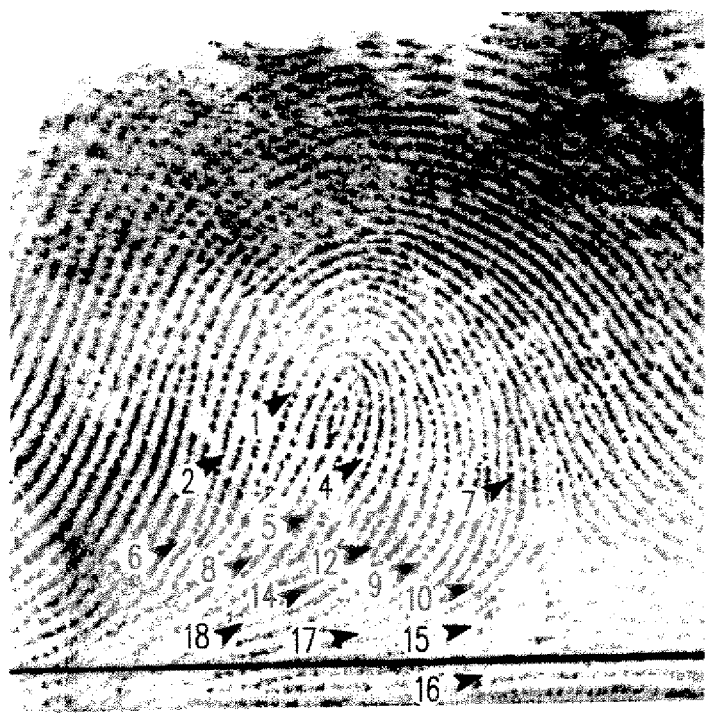

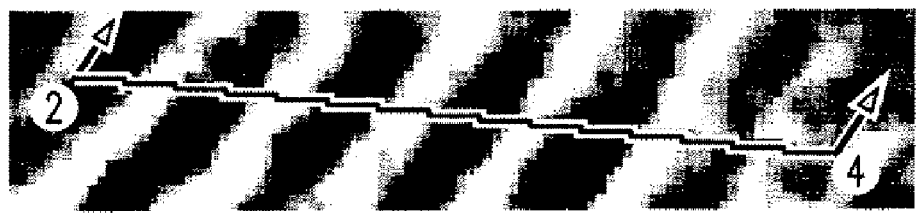
FIG. 6
FIG. 7
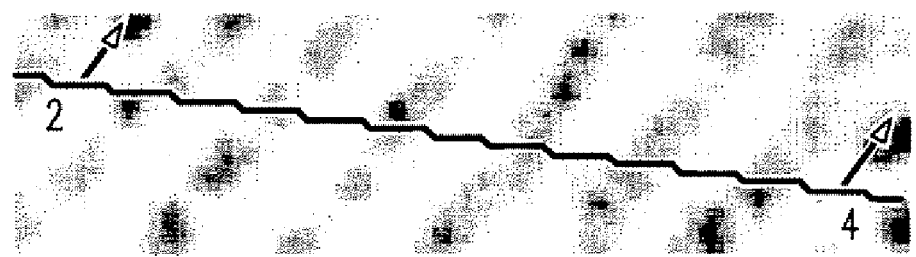

GRAY SCALE MATCHER

FIELD OF THE INVENTION

The present invention relates generally to finger print matching methods and apparatus and more specifically to means for comparing a latent fingerprint to a database of fingerprints to determine if a match to the latent print exists within the database.

BACKGROUND OF THE INVENTION

Law enforcement organizations use fingerprints to confirm the identity of assumed crime suspects or to determine the identity of unknown suspects from prints left at a crime scene. A fingerprint left at a crime scene is typically referred to as a latent print, and the search process of the latent print against a fingerprint database is commonly known as a latent search. There are, generally, two types of latent searches. One is a latent print to a ten-print search. The other is a ten-print to unsolved latent search, also known as a reverse search.

With recent advances in AFIS (automatic fingerprint identification system) technology, the performance of the ten-print to ten-print search has been greatly improved. However, latent search remains a challenge, due to the generally poor image quality of latent prints. Image quality is a much more critical factor in latent print searches than in ten-print to ten-print searches because in a latent search there is only one finger that forms the basis of the comparison. However in a ten-print to ten-print search, while a few of the fingers that form the basis of the search may be of poor image quality, typically several others may be of a high enough image quality to enable effective matching.

Besides fingerprint minutiae, features such as ridge count, ridge curvature, minutiae constellations, core, delta, whorl and other such megafeatures as well as additional classification information may be extracted from fingers that have acceptable image quality. In contract, the generally low image quality of a latent print will usually preclude access to many of these features and limit the precision of the remaining. As a consequence, many fingerprint matcher systems cannot be reliably used on latent prints.

Thus, there exists a need for a method and apparatus that can reliably perform latent searches.

BRIEF DESCRIPTION OF THE FIGURES

A preferred embodiment of the invention is now described, by way of example only, with reference to the accompanying figures in which:

FIG. 4 illustrates a search print image having a plurality of identified minutiae;

FIG. 5 illustrates a file print image having a plurality of identified mated minutiae with the search print image of FIG. 4;

FIG. 6 illustrates a segment corresponding to the search print image of FIG. 4 in accordance with an embodiment of the present invention;

FIG. 7 illustrates a segment corresponding to the file print image of FIG. 5 in accordance with an embodiment of the present invention;

DETAILED DESCRIPTION OF THE INVENTION

Figure 1:
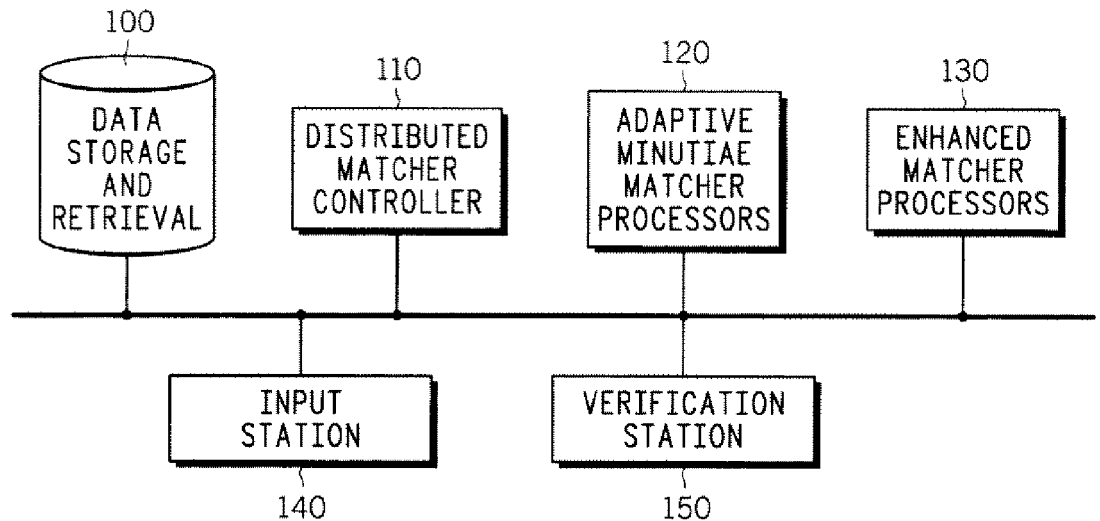
FIG. 1 illustrates a simple block diagram of an automatic fingerprint identification system in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

FIG. 1 illustrates an automatic fingerprint identification system (AFIS) 10 that may be used to incorporate the inventive system and method described herein. System 10 ideally includes an input and enrollment station 140, a data storage and retrieval device 100, a distributed matcher controller 110, at least one conventional adaptive minutiae matcher processor 120, at least one conventional enhanced matcher processor 130 and a verification station 150.

Input and enrollment station 140 is used to capture a print and to optionally extract the relevant matching features of that print for later comparison. File records may also be generated in the input and enrollment station 140 from the captured prints and extracted features. In the input and enrollment station 140, the enrolled prints (also referred to herein as print images) are segmented and quality is assigned to each print to ensure that the print is of sufficient quality to be matched. The integrity of fingerprints may also be checked to ensure that each print image was captured in accordance with one or more capture guidelines. For instance, the integrity of fingerprints can be checked by a slap to roll comparison to determine whether each rolled print was correctly positioned, labeled and segmented. An active file record may be generated from prints having sufficient quality, as controlled by a pre-determined quality threshold, and passive file records may be generated from, for instance, prints whose quality are insufficient or from duplicate prints.

Input and enrollment station 140 may also be used to capture a fingerprint and to optionally extract the relevant matching features of that image for comparison with matching features in one or more file records. A search record may also be generated in the input and enrollment station 140 from the captured images and extracted features. In the input and enrollment station 140, the enrolled prints are segmented and quality is assigned to each print. The integrity of fingerprints is also checked. An active search record may be generated from prints having sufficient quality. Otherwise, the prints may be re-enrolled (i.e., one or more additional prints captured and their quality analyzed), and an active search record extracted from all of the enrolled prints. Thus, input and enrollment station 140 may be coupled to, for instance, flat bed scanners, a ten-print live scanner and a digital camera, which may be used to scan prints or capture latent prints that may be loaded into a processor device such as, for instance, a microprocessor that may be also be coupled to or incorporated within the enrollment station 140 for performing its remaining functions.

Data storage and retrieval unit 100 stores and retrieves the file records, including the matching features, and may also store and retrieve other data useful to carry out the present invention. Adaptive minutiae matcher processors 120 and enhanced matcher processors 130 typically use the extracted matching features of the prints to determine similarity or may be configured to make comparisons at the image level, and verification station 150 is used to verify matching results. Moreover, it is appreciated by those of ordinary skill in the art that although input and enrollment station 140 and verification station 150 are shown as separate boxes in system 10, these two stations may be combined into one station in an alternative embodiment.

Figure 2:
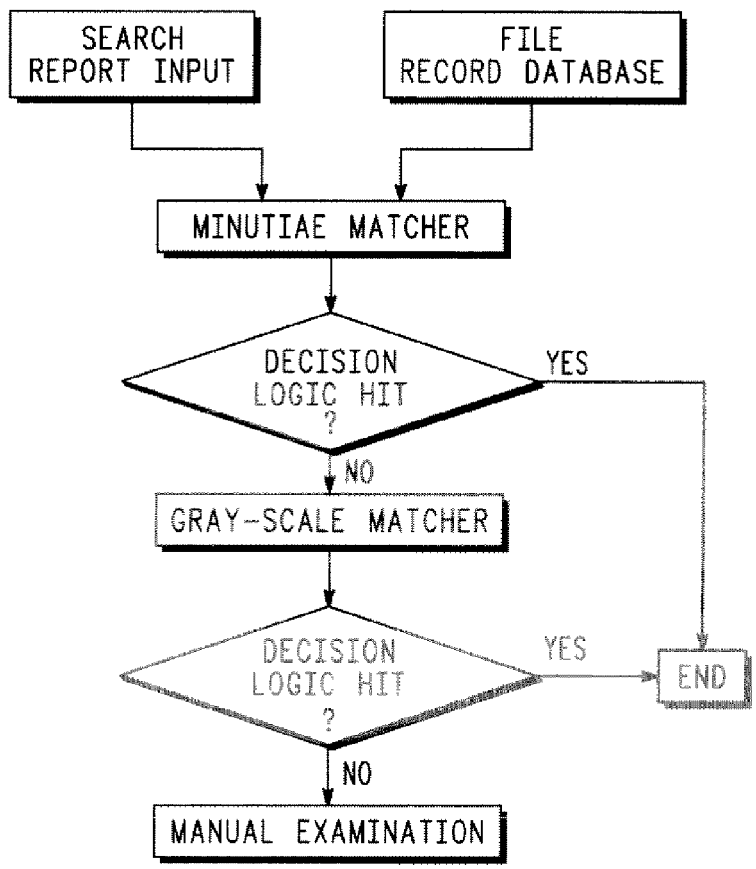
FIG. 2 illustrates a flow diagram of a method for fingerprint matching in accordance with an embodiment of the present invention.

FIG. 2 illustrates a flow diagram of a method for fingerprint matching in accordance with an embodiment of the present invention. The method of FIG. 2 may be stored as software in a suitable storage, e.g., memory, device and may be implemented, i.e., executed, in one or more processors or processing devices in system 10. Alternatively, the methods in accordance with the present invention may be implemented in a hardware device such as, for instance, an application specific integrated circuit.

In operation and in accordance with the method of FIG. 2, the distributed matcher controller 110 receives the active search record (for example one corresponding to a latent print lifted from a crime scene and scanned into the system) from the input and enrollment station 140 and retrieves at least a portion of the active file records from the active file database stored in the data storage and retrieval unit 100. Controller 110 then distributes the active search and file records to the adaptive minutiae matcher processor for performing matching processing. The results of this initial stage matching process is evaluated by a decision logic to determine whether or not a hit is found, and if a strong hit, for instance, is found the search is completed.

Otherwise, a down-selection process in controller 110 may be performed, wherein an ordered or sorted list of possible sets of matching prints is generated for further detailed evaluation. In accordance with this down-selection process, a list of mated minutiae for each set of prints is produced and those prints having scores above a pre-defined level are sent to the secondary matcher(s) 130, such as a Gray Scale Matcher in accordance with the present invention, for a more detailed matching process. The matched results are evaluated again by the decision logic in the controller 110, and if a hit is found, the search is completed. Otherwise, a manual examination may be performed of the search print against one or more file prints having a match score above a certain threshold.

Figure 3:
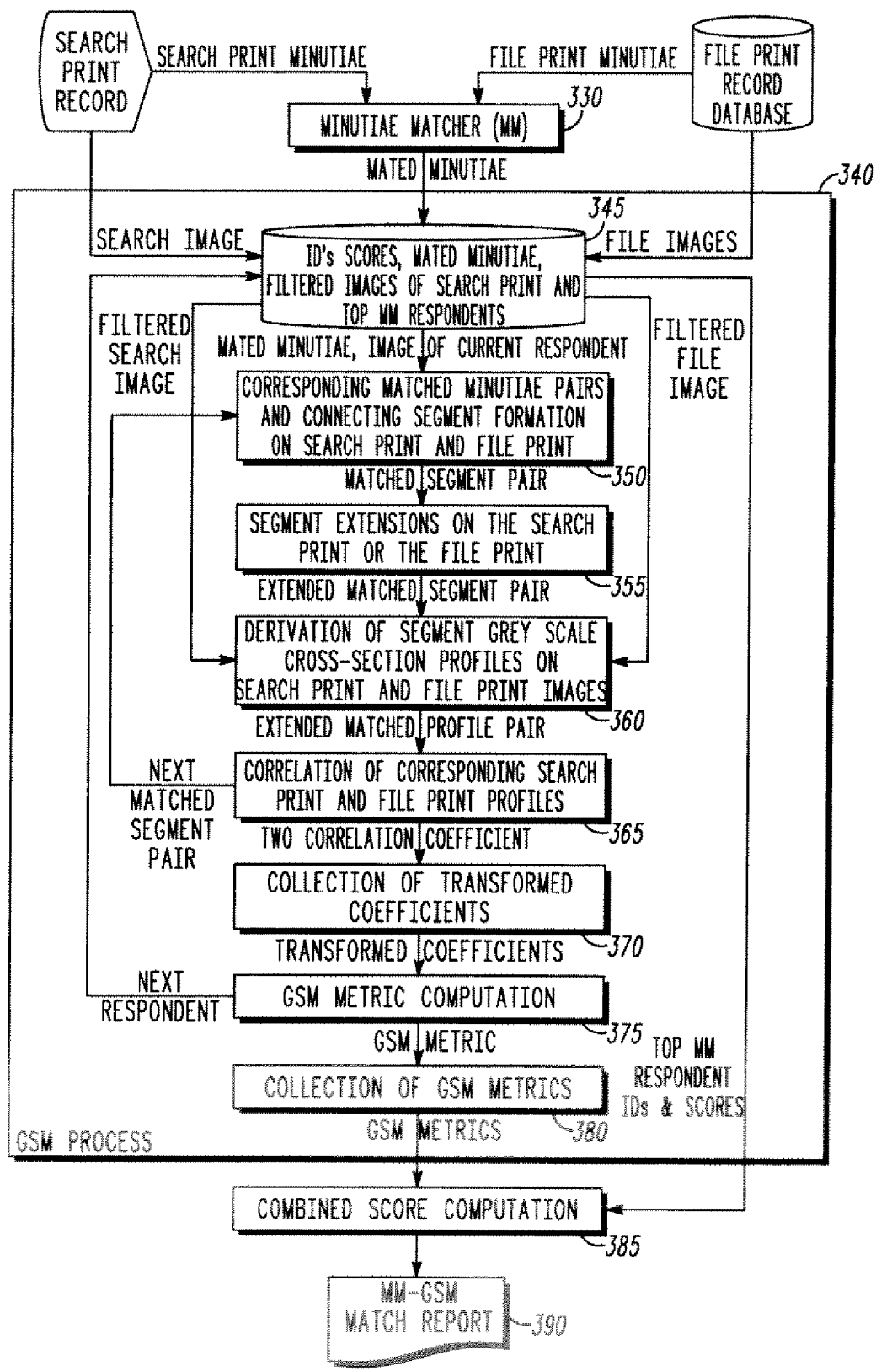
FIG. 3 illustrates a flow diagram of a Gray Scale Matcher operating as a secondary matcher in accordance with an embodiment of the present invention.

Illustrated in FIG. 3 is a high-level flow diagram of the Gray Scale Matcher 340 (GSM) operating as a secondary matcher to a Minutiae Matcher 330 (MM), thus comprising a combined MM-GSM system capable of delivering improved fingerprint matching performance. The method of FIG. 3 may be stored as software in a suitable storage, e.g., memory, device and may be implemented, i.e., executed, in one or more processors or processing devices in system 10. Alternatively, the methods in accordance with the present invention may be implemented in a hardware device such as, for instance, an application specific integrated circuit. Moreover, it will be understood by those of ordinary skill in the art that although the GSM is implemented in the foregoing example as a secondary matcher, it may alternatively be implemented as a primary matcher with an accuracy that is similar to other primary matchers such as the MM. However, GSM's use as a secondary matcher as described herein gives much more reliable results when used to perform latent searches for example.

Returning to the method of FIG. 3, fundamentally, MM performs a topological match of a search print's minutiae in a Search Print Record 310 with the minutiae of each file print in a typically very large File Print Record Database 320. This process generally yields a set of mated minutiae for a portion of the file prints in the database, with a subset of search minutiae being associated with a corresponding matching subset of file print minutiae. Using these mated minutiae, MM quantifies the degree of match between the search print and the file prints in terms of numerical scores, sorts them accordingly, and returns a match report that includes the top-ranked file print IDs with their individual scores.

What follows is a series of stages, e.g., 345 through 380, which support and carry out the functions of GSM 340. Complementing MM's topological matching of search and file print minutiae, GSM focuses on similarity measures based on the gray scale ridge structure within and in the immediate neighborhood of the convex hull defined by the mated minutiae clusters on the search print and the top-ranked MM file print respondents. Corresponding GSM metrics produced by GSM for the MM respondents may then be fused with the corresponding MM scores in Stage 385 and subsequently in the output MM-GSM Match Report 390.

Following is a brief description of the preferred embodiment of the GSM Process 340. The first GSM stage, Stage 345, serves as Storage and/or Conduit for relevant data pertaining to a selected set of top-ranked MM respondents. It includes the respondent file print IDs with their MM scores, their mated minutiae, their variously filtered and/or enhanced gray scale images and that of the search print.

Before proceeding, some definitions are in order. Assume that the entire set of, say n, search minutiae are enumerated from 1 to n and viewed as the list $$\text{SearchMinutiae} = \{\{i, \{x_i^s, y_i^s\}\}\}_{i \in I = \{1, \ldots, n\}}$$

where, the typical element, $\{i, \{x_i, y_i\}\}$, is a sub-list that characterizes a search minutia by its enumerator i and its $\{x_i, y_i\}$ pixel location in image coordinates. Further assume that the subset of a given file print's, say m, minutiae found to match a subset of the search minutiae are correspondingly enumerated. Then, the mated minutiae for the file print may be represented by the associated lists of matched search and file print minutiae $$\text{MatchedSearchMinutiae} = \{\{j, \{x_j^s, y_j^s\}\}\}_{j \in J \subset I}$$

$$\text{MatchedFilePrintMinutiae} = \{\{j, \{x_j^f, y_j^f\}\}\}_{j \in J \subset I}$$

where, enumerator set J is a subset of enumerator set I, and its length, or number of elements in it, is m<=n.

This representation is exemplified in FIGS. 4 and 5, showing a search print image with all its enumerated minutiae and a file print image with a subset of its minutiae that match a subset of the search print's minutiae, as indicated by their enumeration. Note here that the number of search minutiae n=21, their enumerator set $I = \{i\}_{i=1}^{n}$ and enumerator subset J={1,2,4,5,6,7,8,9,10,12,14,15,16,17,18}, which serves to associate the m=15 file print minutiae to those similarly enumerated on the search print. Then, the mated minutiae of a given file print may be viewed, more compactly, as the list $$\text{MatedMinutiae} = \{\{j, \{x_j^s, y_j^s\}, \{x_j^f, y_j^f\}\}\}_{j \in J}$$

composed of commonly enumerated matched pairs of search and file print minutiae coordinates or, more simply, as $$\text{MatedMinutiae} = \{\{\{x_j^s, y_j^s\}, \{x_j^f, y_j^f\}\}\}_{j \in J}$$

the list of the matched minutiae coordinate pairs themselves.

Stages 350 through 375 that follow comprise a loop that processes the selected MM respondents, one file print at a time. The second stage of the GSM process, Stage 350, acquires the mated minutiae for the current respondent file print and proceeds to form pairs of search print matched minutiae and corresponding such pairs of the file print's counterparts. Most simply, this may be done via a list of all combinations of the enumerators in J, which could be used to indirectly access the associated set of search and file print matched minutiae coordinate pairs. Alternatively, these coordinate pairs could be available explicitly. In any case, given m mated minutiae, the number of matched minutiae pairs on each of the search and file prints is $$mm = \frac{m(m-1)}{2}$$

which, in terms of their coordinates, are defined by $$mp_s = \{\{\{x_i^s, y_i^s\}, \{x_j^s, y_j^s\}\}\}_{i,j \in J; i \neq j}$$

$$mp_f = \{\{\{x_i^f, y_i^f\}, \{x_j^f, y_j^f\}\}\}_{i,j \in J; i \neq j}$$

Taken as end points of ideal straight-line segments, sampled segments may be constructed by inserting intermediate image pixel coordinates that fall closest to these lines. As a consequence, corresponding, or matched sampled segments on the search and file prints may be defined by the lists $$seg_s = \{\{\{x_i^s, y_i^s\}, \{x_{1(i,j)}^s, y_{1(i,j)}^s\}, \ldots, \{x_{K(i,j)}^s, y_{K(i,j)}^s\}, \{x_j^s, y_j^s\}\}\}_{i,j \in J; i \neq j}$$

$$seg_f = \{\{\{x_i^f, y_i^f\}, \{x_{1(i,j)}^f, y_{1(i,j)}^f\}, \ldots, \{x_{L(i,j)}^f, y_{L(i,j)}^f\}, \{x_j^f, y_j^f\}\}\}_{i,j \in J; i \neq j}$$

where, K(i,j) and L(i,j) are the numbers of intermediate points that have been inserted in the {i,j}th ideal search and file print segments, respectively. Merged term-wise in pairs, these two sets of matched sampled segments form the so-called mated segments $$msegs = \{\{\{\{x_i^s, y_i^s\}, \ldots, \{x_{K(i,j)}^s, y_{K(i,j)}^s\}, \{x_j^s, y_j^s\}\}, \{\{x_i^f, y_i^f\}, \ldots, \{x_{L(i,j)}^f, y_{L(i,j)}^f\}, \{x_j^f, y_j^f\}\}\}\}_{i,j \in J; i \neq j}$$

whose typical element is a matched sampled segment pair or, more simply, a matched segment pair. In view of FIG. 5, the 15 file print matched minutiae will give rise to 105 matched segment pairs.

The third GSM stage, Stage 355, operates on matched segment pairs, one at a time, in such a way as to properly accommodate special requirements, if necessary, in subsequent processing by the following two stages, Stage 360 and Stage 365. As a consequence, these three stages should ideally be coupled and managed accordingly.

The basic idea underlying GSM involves using a matched segment pair to sample the search and file print images, $p_s$ and $p_f$, at their respective coordinate points, returning corresponding lists of gray scale values that constitute search and file print image sampled cross section profiles (or waveforms)

$$csp_s = \{\{p_s\{x_i^s, y_i^s\}, p_s\{x_{1(i,j)}^s, y_{1(i,j)}^s\}, \ldots, p_s\{x_{K(i,j)}^s, y_{K(i,j)}^s\}, p_s\{x_j^s, y_j^s\}\}\}_{i,j \in J; i \neq j}$$

$$csp_f = \{\{p_f\{x_i^f, y_i^f\}, p_f\{x_{1(i,j)}^f, y_{1(i,j)}^f\}, \ldots, p_f\{x_{L(i,j)}^f, y_{L(i,j)}^f\}, p_f\{x_j^f, y_j^f\}\}\}_{i,j \in J; i \neq j}$$

which will henceforth be referred to more simply as matched profile pairs.

GSM seeks to derive a reasonable similarity measure between these two sampled waveforms via correlation. To do this properly, it is important to accommodate relative shifts between the matched profiles due to relative minutiae location errors between the search and file prints and, possibly, other reasons such as relative distortion. Before proceeding with the subsequent detailed discussion, it might be helpful to define two relevant terms, extension and oversampling. In reference to a segment defined fundamentally by its end points at specific pixel locations, extension involves extending its end points collinearly beyond its original ones by a certain number of pixels. The resulting segment may then be represented by the sequence of pixel locations closest to the connecting straight line between and including the two end points. The associated cross-section profile is a sequence of gray scale values at these samples. Oversampling relates to a cross section profile, whereby additional gray scale samples are produced between the original ones using an appropriate interpolation technique, resulting in a more densely sampled profile and thus an increase in the number of samples representing it.

Extending one of the segments and thus its profile by a sufficient number of samples on either end, the other segment's profile could more likely be maximally correlated at some relative shift with respect to the extended profile. However, before this can be done, there is yet another possible limitation that should be addressed. Ideally, the two segments should have the same number of samples. This is because the two segments connect respective mated minutiae pairs on the search and file prints and they are tacitly assumed to be mated correctly. However, depending on their relative orientation, the two segments might differ in spatial sample rate and thus in the number of samples.

One way to address this issue is to use interpolation to accomplish two results—to ensure that the two derived profiles, before segment extension, have the same number of samples, and to produce, after segment extension, two profiles where one is longer than the other by a specified number of samples on each end. As an example, of how this could be done, consider the case involving the matched segments associated with matched minutiae pairs {2,4}, as shown in FIGS. 6 and 7, where the file print segment is shown to be extended past its minutiae end points.

Let the original matched segments (prior to extension) on the search and file prints have $n_s$ and $n_f$ samples, respectively. Then, there are three possibilities to be addressed: namely, $n_s = n_f$, $n_s > n_f$, and $n_s < n_f$. Assuming that the minutiae involved are correctly matched, it is reasonable to require that the derived matched profiles have the same number of samples at the same spatial sampling rate. When $n_s = n_f$, the two profiles, prior to extension, are already of the same length, so there is nothing to be done. When $n_s > n_f$, the file print's profile must be over-sampled at a rate of $n_s/n_f$ in order to attain the same number of samples, $n_s$. Similarly, when $n_s < n_f$, the search print profile must be over-sampled at a rate of $n_f/n_s$, so as to attain the same number of samples, $n_f$.

Now we turn to using interpolation to extend one of the segments, for example the file print segment as illustrated in FIG. 7. To ensure that the extended file print profile has a specified fixed number of additional samples, e.g. $2n_{x0}$, more than that of the search print, the segment extension must be chosen consistently with each of the three possibilities stated above. It should be noted that $n_{x0}$, the number of pixels that the chosen profile is extended ideally at each end, must be large enough to contain the uncertainty in relative longitudinal displacement between the corresponding search and file print profiles based on observed minutiae positioning errors, typically about 10 pixels.

Let $n_x$ be the number of samples the file print segment is to be extended by at each end in order to guarantee that its profile is $2n_{x0}$ samples longer, than that of the search print, after appropriate over-sampling. Then, when $n_s=n_f$, the file print segment is extended by $n_x=n_{x0}$ samples at each end, whence its profile ends up with $n_s+2n_{x0}$ samples. When $n_s>n_f$, the file print segment is extended by $n_x=n_{x0}(n_f/n_s)$ samples past each end and, after over-sampling at a rate of $n_s/n_f$, its profile ends up with $n_s+2n_{x0}$ samples. When $n_s<n_f$, the search print profile is over-sampled at a rate of $n_f/n_s$ to end up with $n_f$ samples, while the file print segment is extended by $n_{x0}$ samples at each end, whence its profile ends up with $n_f+2n_{x0}$ samples. Thus, after appropriate segment extension, the derived file print profile is $2n_{x0}$ samples longer than the search print profile for any of the three stated possibilities. Note again that, due to displacement errors of the corresponding minutiae pairs on the search and file prints, the chosen segment is extended on both ends to accommodate relative longitudinal displacement of one profile with respect to the other in either direction and thus allow for the computation of the maximum or maximum absolute correlation.

It should be mentioned that the roles of the search and file prints above could be reversed without any loss in generality. Hence, given a matched segment pair, the choice of which of the two segments is to be extended, or have the longest profile, is arbitrary. However, in the preferred embodiment, the segment of choice is the one that has fewer samples, whether it is on the file print or the search print. Over-sampling could be accomplished most simply via linear interpolation, but could employ more precise techniques such as quadratic, cubic splines, or any other suitable ones known in the art. What is significant here is that interpolation is used to support so-called "elastic correlation" of matched profiles, thus suppressing undesirable effects of relative orientation variations between matched segments and, to some extent, local relative distortion. Alternate approaches should be obvious to those skilled in the art. One variant could involve the actual interpolation of gray scale values along ideal straight-line matched segments at a suitable fixed spatial sampling rate, which would be appropriately applied to extended versions thereof.

Stage 360 accepts the matched segment pair, one of which has been extended as needed, and uses search print and file print images stored in Stage 345 to derive the corresponding matched cross section profiles after appropriate interpolation. The images may be the original gray scale ones or, preferably, band-limited versions thereof, using 2-dimensional uniform, raised-cosine, Gaussian or other suitable rectangular or circular band-pass filters known in the art. As an example, a uniform square band-pass filter would involve an impulse response composed of the difference of two normalized uniform square responses, a narrow 5×5-pixel response minus a 17×17-pixel one. Convolution with the first response would return a smoother image, while the second would remove a local average value, thus compensating for intensity variations. Band-pass filtered images will thus generate smoother, nearly zero-mean profile waveforms and thus more suitable and reliable for interpolation and correlation computations.

Figure 8:
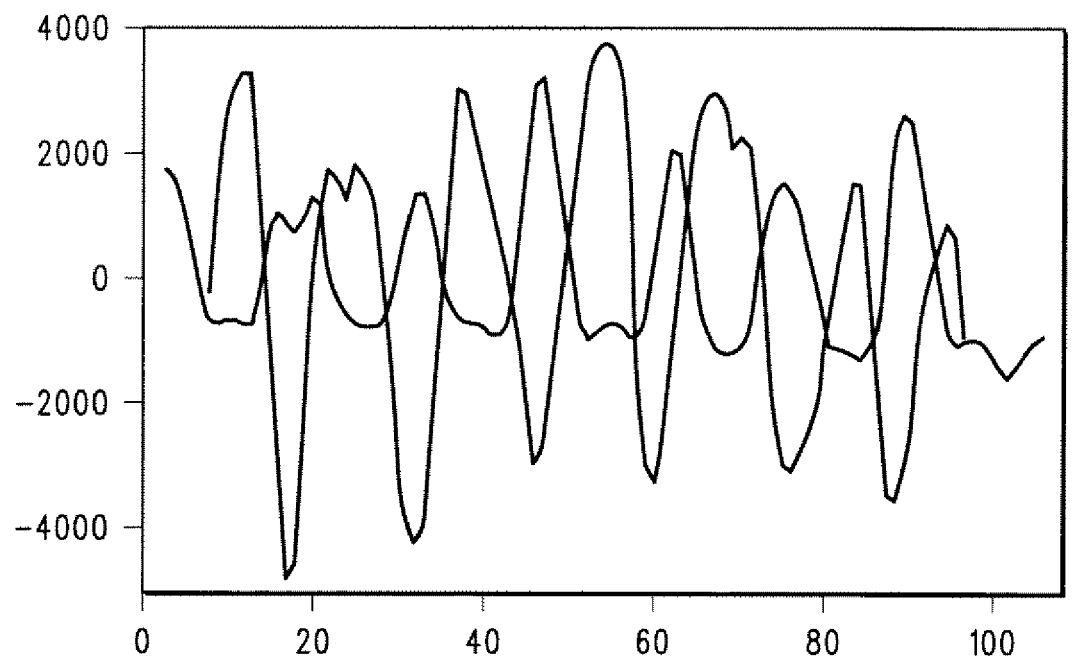
FIG. 8 illustrates matched cross-section profiles based on the search and file print segments of FIGS. 6 and 7 that are aligned for maximum negative correlation in accordance with an embodiment of the present invention.
Figure 9:
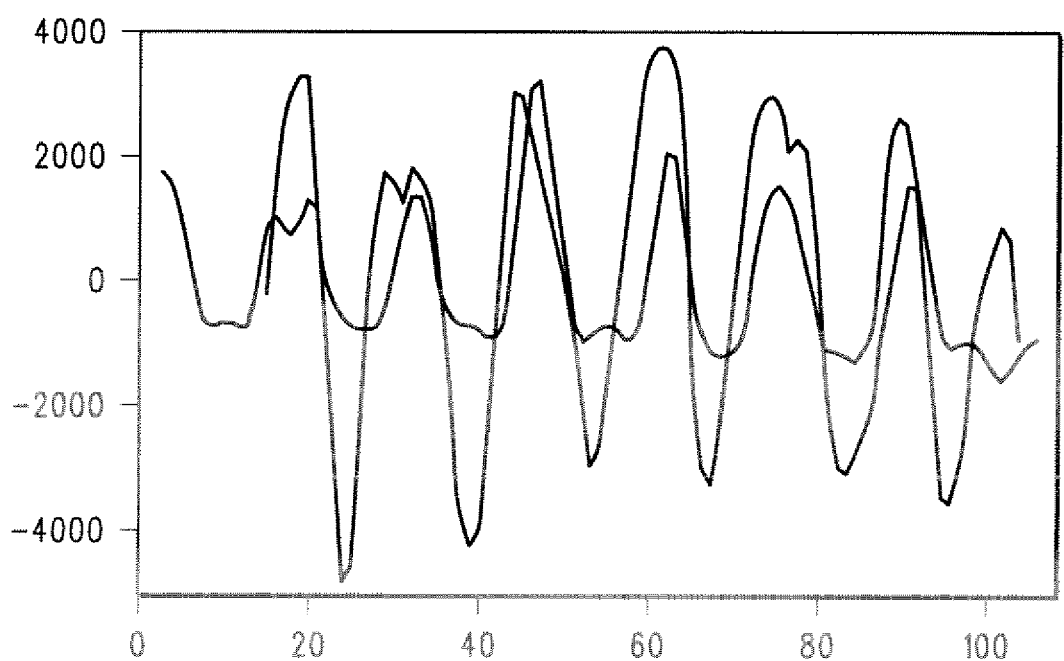
FIG. 9 illustrates matched cross-section profiles based on the search and file print segments of FIGS. 6 and 7 that are aligned for maximum positive correlation in accordance with an embodiment of the present invention.

Stage 365 takes the final, matched profile pair, and proceeds to correlate the shorter against the longer, computing correlation coefficients at each shift position from left to right, in search of a maximum measure of similarity. For the specific case involving the segments in FIGS. 6 and 7, the derived profiles are shown in FIGS. 9 and 8 where they are aligned for maximum positive and maximum negative correlation, respectively. Indeed, the waveforms in FIG. 9 are maximally in phase, whereas the waveforms in FIG. 8 are maximally out of phase. The degree of similarity between the two waveforms may thus be measured, not only in terms of the maximum correlation coefficient (the conventional definition) indicative of FIG. 9, but also via the maximum absolute correlation coefficient implied by FIG. 8.

Before giving precise definitions of these two correlation coefficients, let $$csp_s = \{s_i\}_{i=1}^{ns}$$

$$csp_f = \{f_i\}_{i=1}^{ns+2n_{x0}}$$

represent the final matched profiles for the segments in question, that is, the matched profiles after segment extension and interpolation have been carried out, whereby the file print profile is, for example, exactly $2n_{x0}$ samples longer. Then, correlating the search print profile against the file print profile produces a sequence $2n_{x0}+1$ of correlation coefficients $$c_{sf} = \{c_k\}_{k=0}^{2n_{x0}}$$

where, each one represents a degree of similarity between the two profiles at each shift of the search profile, from left to right, along the file print profile, and $$c_k = \frac{\sum_{i=1}^{n_s} s_i f_{i+k}}{\sqrt{\sum_{i=1}^{n_s} s_i^2 \sum_{i=1}^{n_s} f_{i+k}^2}}$$

is the correlation coefficient at the k-th shift position. For this definition to be precise, lists $$\{s_i\}_{i=1}^{n_s}$$

$$\{f_{i+k}\}_{i=1}^{n_s}; k=0,1,\ldots,2n_{x0}$$

should ideally be zero-mean. Considering that the filtered images are themselves not entirely zero mean, this requirement cannot be guaranteed. As a consequence, a more precise alternative to the above definition is $$c_k = \frac{\sum_{i=1}^{n_s} \bar{s}_i \bar{f}_{i+k}}{\sqrt{\sum_{i=1}^{n_s} \bar{s}_i^2 \sum_{i=1}^{n_s} \bar{f}_{i+k}^2}}$$

where, the average values of all quantities involved have been removed. Then, the desired maximum and maximum absolute correlation coefficients corresponding to the profile alignments in FIGS. 9 and 8 are given by $$c_{max1} = max(c_{sf})$$

$$c_{max2} = max(abs(c_{sf}))$$

respectively, representing alternate measures for the greatest degree of similarity between the two profiles. While $c_{max1}$ is the normal or conventional correlation coefficient, $c_{max2}$ is also important because it circumvents practical limitations of $c_{max1}$ in situations involving long ridges, for example, where one of the matched segments is riding a long ridge and the other barely grazes or misses it altogether. By the same token, total reliance on $c_{max2}$ is not ideal because of occasional artifacts that might occur. For this reason, GSM ideally makes use of both correlation coefficients in evaluating the similarity of matched profiles. The two correlation coefficients are passed to Stage 370 and the loop continues by addressing the next matched segment.

Stage 370 receives these two correlation coefficients, transforms them, and collects them in two lists for the file print being processed. Based on statistical considerations, the coefficients are transformed in such a way as to accommodate the natural degradation of accuracy with increased distance and to emphasize higher correlation values over lower ones. This may be accomplished by squaring each correlation coefficient for matched profile while augmenting it multiplicatively by the square root of the associated search print segment's length. When a file print has been completely processed by the previous loop, the collection of transformed coefficients consists of the following two lists $$c_1 = \{c_{max1}^2(i)d(i)\}_{i=1}^{mm}$$

$$c_2 = \{c_{max2}^2(i)d(i)\}_{i=1}^{mm}$$

where, $d(i)$ is the Euclidean length of the $i_{th}$ segment, preferably on the search print. This is because since search prints are usually marked by human experts, such a distance on the search print is more reliable and, further, the corresponding distances on the file prints being searched will generally fall on either side of this value, making it the virtual mean value. Choosing $d(i)$ to be the print segment distance will introduce a bias, although not a significant one. Other reasonable transformations motivated by practical consideration are also possible, as would occur to someone skilled in the art. For example, image quality might be reflected as a weighting factor in the transformations above.

Ideally, stage 375 takes the two sets of mm transformed coefficients for a given file print and computes two metrics, for example, $$GSMmetric_1 = mm^{0.25}\mu_1$$

$$GSMmetric_2 = mm^{0.25}\mu_2$$

or, preferably, with the errors in these estimates removed $$GSMmetric_1 = mm^{0.25}(\mu_1 - \sigma_1/mm^{0.5})$$

$$GSMmetric_2 = mm^{0.25}(\mu_2 - \sigma_2/mm^{0.5})$$

Here, $\mu_1$ and $\mu_2$ are the mean values the two coefficients, while $\sigma_1$ and $\sigma_2$ are their standard deviations. The factor, $mm^{0.25}$, used here could be augmented according to the fingerprint matching application, something that could be decided by anyone skilled in the art. A single GSM metric may then be computed at this stage of processing for a given file print based on the fusion of these two metrics via addition, multiplication, or other means. The loop continues by addressing the next respondent. The choice of one of the alternate metrics as the single GSM metric is always an option.

As each file print is completed, GSM metrics are collected in Stage 380 until all MM respondents have been processed. At that point they are optionally normalized to unity, as is appropriate for latent matching. However, this policy might not be desirable in other applications where raw metrics would be more meaningful to one skilled in the art.

Finally, the complete collection of GSM metrics are passed to Stage 385 where they may be combined with the corresponding MM scores via additive, multiplicative, or other suitable fusion technique known in the art, including eigenspace methods. The end result is a combined MM-GSM Match Report, at Stage 390, of the MM respondents in a rank order based on combined scores. Since MM and GSM represent substantially independent views of a print image, spatial versus structural respectively, combining the two via multiplicative or other fusion techniques should invariably result in a statistical performance improvement.

Figure 10:
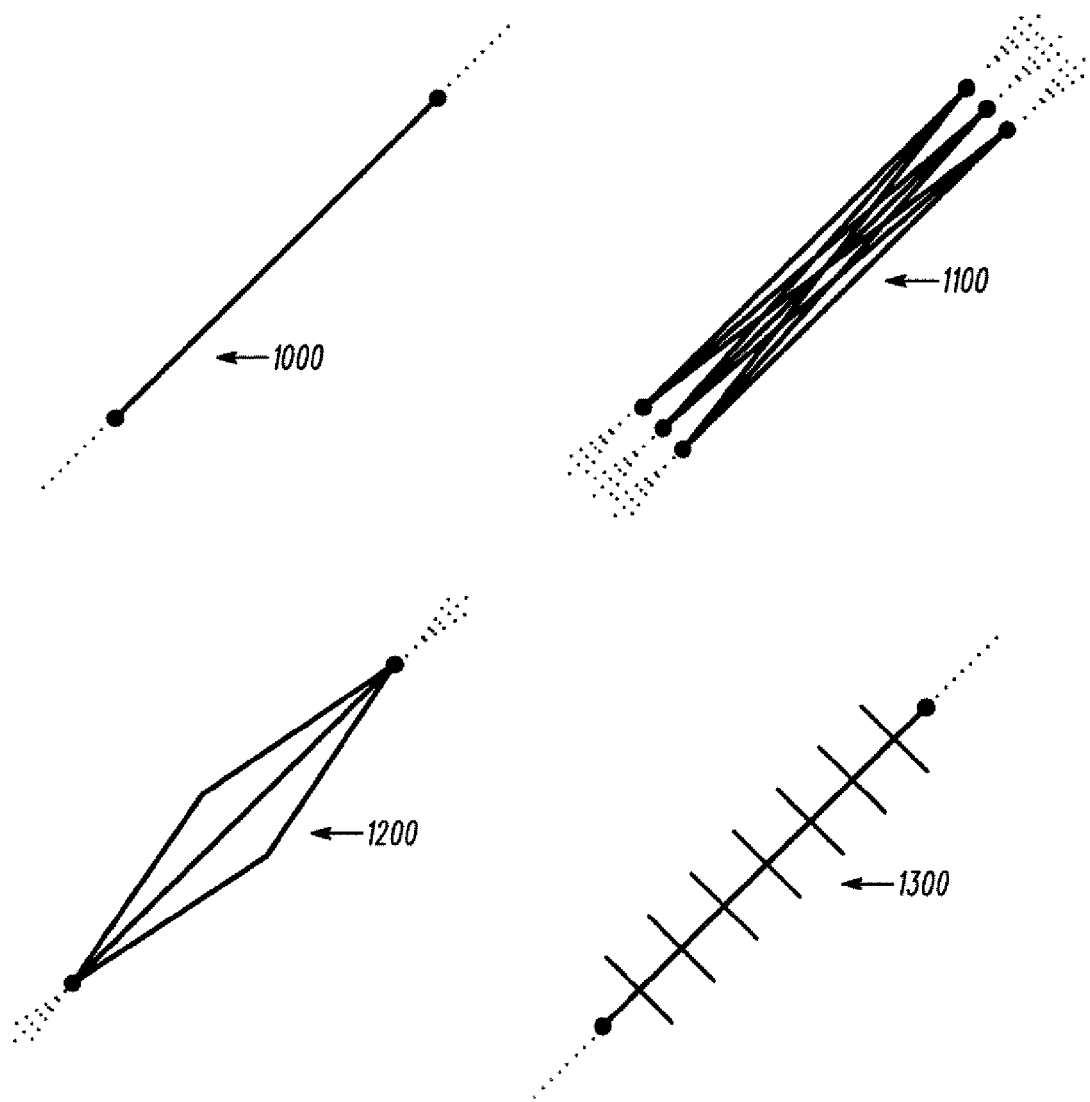
FIG. 10 illustrates segment alternatives for implementing embodiments of the present invention.

With regard to dealing more effectively against relative position errors of mated minutiae and relative distortion between a search and file prints, some additional embodiments of the present invention may be implemented. One such embodiment addresses the possibility of altering the choice of mated minutiae. For example, for each of the mated minutiae of a file print, one or more unmatched nearest neighbors may be identified. Using combinations of such neighbors, alternate segments may be evaluated in search of improved correlation values, $c_{max1}$ and/or $c_{max2}$. Another embodiment may consider different segment alternatives such as is illustrated in FIG. 10. More specifically, in addition to the single (or linear) segment option upon which all previous discussion was based and that is illustrated as segment 1000, three other types are presented. The dithered segment 1100 may be used to improve the values of correlation coefficients, $c_{max1}$ and/or $c_{max2}$, by testing diagonal and lateral perturbations of the original segment and finding the maximum such values among them. The piecewise linear segment 1200 may be used to address relative distortion by modeling relative curvature between matched segments with alternate piecewise linear segments, composed of two or more sub-segments. Finally, the orthogonal segment 1300 may be used to improve overall discrimination by exploring the local neighborhood along the original segment. Combinations of these options could also be entertained.

The above options not withstanding, there is also another embodiment of the multi-segment based approach of the present invention. Fundamentally, this embodiment involves taking the individual segment cross-section profiles and concatenating them into one composite profile on both the search and file prints. More specifically, the constituent profile components that comprise these two composite profiles are actually those of best mutual alignment on the search and file prints which, in turn, implies that the longest of each such constituent pair is truncated appropriately to be of equal length to the shortest. In this embodiment, the correlation coefficients are computed as in the disclosed invention. Considerations of image quality and area coverage could also be incorporated into this embodiment as well as in the above-described embodiments.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for comparing a first print image having a first set of minutiae to a second print image having a second set of minutiae, wherein at least a second subset of minutiae from the second set is mated to a first subset of minutiae from the first set, the method comprising the steps of:

selecting a first pair of minutiae from the first subset and a second pair of corresponding mated minutiae from the second subset;

generating a first segment by connecting the first pair of minutiae, wherein the first pair of minutiae are endpoints to the first segment and a second segment by connecting the second pair of minutiae, wherein the second pair of minutiae are endpoints to the second segment;

extending the first segment or the second segment so that one segment is longer than the other segment;

generating a first cross-section waveform profile based on the first segment and a second cross-section waveform profile based on the second segment, wherein the extended segment is used to generate a corresponding extended cross-section waveform profile that is longer that the other cross-section waveform profile by a predetermined number of samples;

computing at least one similarity measure that is indicative of the similarity between the first cross-section waveform profile and the second cross-section waveform profile by correlating the shorter cross-section waveform profile against the extended cross-section waveform profile; and calculating a metric based on the at least one computed similarity measure which indicates similarity between the first print image and the second print image.

2. The method of claim 1, wherein the minutiae in the first pair correspond to a first pair of pixel locations on the first print image and the minutiae in the second pair correspond to a second pair of pixel locations on the second print image, the method further comprising the steps of:

sampling the first print image based on at least the first pair of pixel locations for generating the first segment comprising a first number of samples; and sampling the second print image based on at least the second pair of pixel locations for generating the second segment comprising a second number of samples.

3. The method of claim 2, wherein the first and second segments each comprise at least one of: a linear segment; a dithered segment; a piecewise linear segment; or an orthogonal segment.

4. The method of claim 3, wherein:

the first print image is sampled based upon the first pair of pixel locations and based on at least one intermediate pixel location closest to a straight line connecting the first pair of pixel locations to generate a first linear segment; and the second print image is sampled based upon the second pair of pixel locations and based on at least one intermediate pixel location closest to a straight line connecting the second pair of pixel locations to generate a second linear segment.

5. The method of claim 2, wherein the first print image is a first grayscale image, and the second print image is a second grayscale image, the method further comprising the steps of:

obtaining a first set of gray scale values corresponding to the first number of samples and generating the first cross-section waveform profile from the first set of gray scale values; and obtaining a second set of gray scale values corresponding to the second number of samples and generating the second cross-section waveform profile from the second set of gray scale values.

6. The method of claim 5, wherein the grayscale image is band-limited using at least one band-pass filtering technique.

7. The method of claim 1, wherein the first and the second segments each have a first end and a second end, and the extended segment is extended equally on both ends.

8. The method of claim 1, wherein the extended cross-section waveform profile and the shorter cross-section waveform profile each have a first end and a second end, the step of correlating the shorter cross-section waveform profile against the extended cross-section waveform profile comprising the steps of:

aligning the first end of the shorter cross-section waveform profile with the first end of the extended cross-section waveform profile;

aligning the shorter cross-section waveform profile with the extended cross-section waveform profile at least one predetermined interval between the first and second ends of the extended cross-section waveform profile;

aligning the second end of the shorter cross-section waveform profile with the second end of the extended cross-section profile; and computing a corresponding correlation coefficient at each alignment, whereby the correlation coefficient is the similarity measure at its corresponding alignment.

9. The method of claim 8 further comprising the step of selecting at least one maximum correlation coefficient from the computed correlation coefficients that is indicative of at least one maximum point of similarity between the first cross-section waveform profile and the second cross-section waveform profile.

10. The method of claim 9, wherein a maximum normal correlation coefficient is selected that is indicative of a maximum point of positive similarity between the first cross-section waveform profile and the second cross-section waveform profile and a maximum absolute correlation coefficient is selected that is indicative of a maximum point of absolute similarity between the first cross-section waveform profile and the second cross-section waveform profile.

11. The method of claim 10, further comprising the step of computing a transformed maximum normal correlation coefficient and a transformed maximum absolute correlation coefficient.

12. The method of claim 11, wherein the transformed maximum normal and absolute correlation coefficients are computed based on at least one of image quality along the first and the second segments and Luclidean length of one of the first segment and the second segment.

13. The method of claim 10 further comprising the steps of:

computing a maximum normal correlation coefficient for each possible combination of mated minutiae pairs in the first and second subsets to generate a set of maximum normal correlation coefficients; and computing a maximum absolute correlation coefficient for each possible combination of mated minutiae pairs in the first and second subsets to generate a set of maximum absolute correlation coefficients.

14. The method of claim 13 further comprising the steps of computing a first metric as a function of the correlation coefficients in the set of maximum normal correlation coefficients and a second metric as a function of the correlation coefficients in the set of maximum absolute correlation coefficients.

15. The method of claim 14 further comprising the step of computing a first combined metric based on the fusion of the first metric with the second metric.

16. The method of claim 15, wherein the fusion is performed based on at least one of: addition and multiplication.

17. The method of claim 15, wherein in the first combined metric is generated in a first fingerprint matcher system and a third metric is generated in a second fingerprint matcher system, the method further comprising the step of computing a second combined metric based on the fusion of the first combined metric with the third metric.

18. The method of claim 17, wherein the fusion is performed based on at least one of: addition, multiplication, and an eigenspace method.

19. The method of claim 10 further comprising the steps of selecting at least one non-mated minutiae from one of the first and the second sets of minutiae that is within a predetermined distance from at least one minutiae in one of the first and the second selected pairs of minutiae and regenerating the corresponding segment and cross-section profile, and re-computing the corresponding maximum normal correlation coefficient and maximum absolute correlation coefficient.

20. The method of claim 10 further comprising the steps of:
generating a segment and corresponding cross-section waveform profile for each possible combination of mated minutiae pairs in the first subset;
generating a segment and corresponding cross-section waveform profile for each possible combination of mated minutiae pairs in the second subset;
combining at least a portion of the cross-section waveform profiles generated based on the minutiae pair combinations of the first subset to generate a first composite cross-section waveform profile;
combining at least a portion of the cross-section waveform profiles generated based on the minutiae pair combinations of the second subset to generate a second composite cross-section waveform profile;
over-sampling one of the first composite cross-section waveform profile and the second composite cross-section waveform profile; and
computing the maximum normal correlation coefficient and the maximum absolute correlation coefficient based on the correlation of the shorter composite cross-section waveform profile against the longer composite cross-section waveform profile.

21. The method of claim 20, wherein the first number of samples is different from the second number of samples, the method further comprising the step of over-sampling one of the first and the second cross-section waveform profiles for causing the first and the second cross-section waveform profiles to have the same number of samples prior to the step of extending one of the first and the second segments.

22. The method of claim 21 further comprising the step of over-sampling the extended cross-section waveform profile for causing it to be longer than the shorter cross-section waveform profile by the predetermined number of samples.

23. The method of claim 21 wherein the over-sampling is done using interpolation.

24. The method of claim 23, wherein the interpolation is one of a linear, a quadratic, and a cubic spline interpolation technique.

* * * * *